(12) United States Patent
Harley

(10) Patent No.: US 10,160,517 B1
(45) Date of Patent: Dec. 25, 2018

(54) WATERCRAFT HULL WITH ANGLED KEELS

(71) Applicant: Howard D. Harley, Bartow, FL (US)

(72) Inventor: Howard D. Harley, Bartow, FL (US)

( * ) Notice: Subject to any disclaimer, the term of this patent is extended or adjusted under 35 U.S.C. 154(b) by 0 days.

(21) Appl. No.: 15/971,229

(22) Filed: May 4, 2018

Related U.S. Application Data

(60) Provisional application No. 62/501,431, filed on May 4, 2017.

(51) Int. Cl.
| B63B 3/38 | (2006.01) |
|---|---|
| B63B 1/12 | (2006.01) |
| B63B 1/38 | (2006.01) |
| B63B 1/20 | (2006.01) |

(52) U.S. Cl.
CPC ............... *B63B 3/38* (2013.01); *B63B 1/121* (2013.01); *B63B 1/20* (2013.01); *B63B 1/38* (2013.01); *B63B 2001/201* (2013.01); *B63B 2001/202* (2013.01); *B63B 2001/203* (2013.01); *B63B 2001/206* (2013.01)

(58) Field of Classification Search
CPC .. B63B 1/121; B63B 1/20; B63B 1/38; B63B 3/38
USPC ........................................................ 114/61.2
See application file for complete search history.

(56) References Cited

U.S. PATENT DOCUMENTS

| 2,950,699 | A | * | 8/1960 | Ogden | .................... B63B 35/73 |
|---|---|---|---|---|---|
| | | | | | 114/283 |
| 3,191,572 | A | | 6/1965 | Wilson | |
| 4,031,841 | A | | 6/1977 | Bredt | |
| 4,392,445 | A | | 7/1983 | Burg | |
| 4,523,536 | A | | 6/1985 | Smoot | |
| 5,415,120 | A | | 5/1995 | Burg | |
| 5,570,650 | A | * | 11/1996 | Harley | ...................... B63B 1/12 |
| | | | | | 114/61.2 |
| 2003/0101919 | A1 | * | 6/2003 | Stevens | ................. B62B 15/002 |
| | | | | | 114/272 |

* cited by examiner

*Primary Examiner* — Stephen P Avila
(74) *Attorney, Agent, or Firm* — Nicholas Pfeifer; Smith & Hopen, P.A.

(57) ABSTRACT

A pressurized air cushioned hull with fixed rigid side, front and rear seals. The hull includes a plurality of keels, with an air cushion disposed between inboard walls of each keel and an air cushion created/disposed along the outboard walls of each keel. These air cushions along the outboard walls of the keels are created by angling each keel by about 0.02° to about 1° relative to the longitudinal axis of the hull, wherein the left keel(s) is rotated clockwise and the right keel(s) is rotated counterclockwise, such that a distance between the keels is smaller at the front end of the keels than at the rear end of the keels. This slight angle was found to allow air, rather than water, to contact the outboard walls, unexpectedly reducing drag resistance a significant amount, thus improving performance of the hull as a whole.

21 Claims, 12 Drawing Sheets

1 Degree
Inboard
Slanted
Keels
All
Keels

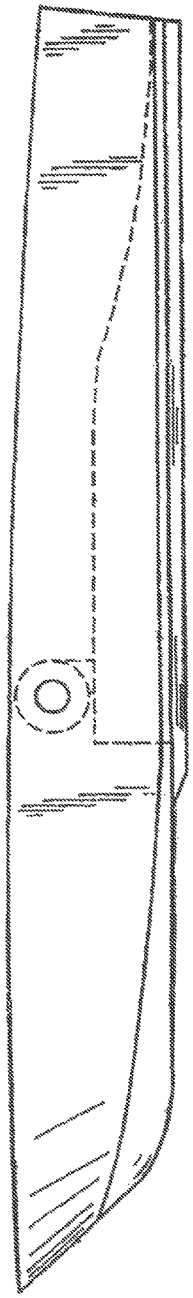

WATERCRAFT HULL WITH ANGLED KEELS

RELATED PATENT

This nonprovisional application relates to U.S. Pat. No. 5,570,650, entitled "Surface Effect Vessel Hull", filed Mar. 21, 1996 by the same inventor, the entirety of which is incorporated herein by reference.

BACKGROUND OF THE INVENTION

1. Field of the Invention

This invention relates, generally, to surface effect ships (SESs). More specifically, it relates to pressurized air cushioned hulls with fixed rigid side seals.

2. Brief Description of the Prior Art

One of the primary objectives in boat design is to reduce the amount of drag caused by the interface of the hull with the water surface. Early planing hulls were designed so that forward motion of the hull raised the vessel to cause it to ride on a smaller portion of its hull surface, resulting in reduced hull-to-water friction. The design of hydrofoil vessels further reduced hull contact with the water by attaching foils to the hulls upon which the boats ride at high speed. Some marine vessels interpose a film of air between the vessel's hull and the water to reduce the hull-to-water friction. One example is illustrated in U.S. Pat. No. 3,191,572 to H. A. Wilson in which a tri-hulled vessel has air introduced along the bottom of each hull. This air is allowed to stream freely from the stern of the vessel. U.S. Pat. No. 4,031,841 to Bredt also discloses the technology for an air film hull. In both of the Bredt and Wilson hulls, the drag between a portion of the bottom of the hull is somewhat reduced by a film of air mixed with water, though both still ride with the hull relatively low in the water so that much of the sides of the hulls maintain contact with the water.

Vessel hull designs began to incorporate air cushions as an improvement over air film hulls, as air cushion hulls are raised out of the water by a pressurized air cushion that is partially captured within the hull of the vessel. Conventional air cushion hull designs contain the air cushion with flexible seals, which are a rubberized curtain, either (1) all around the vessel as in the case of the hovercraft air cushioned vessels, or (2) across the front and the back of the vessel within parallel side hulls that provide a side seal for the air cushion as in the case of surface effect ships (SESs).

The flexible seals reduce the amount of air lost from the air cushion but create a rough ride, "a cobble stone ride," even in smooth water. As the surface of the water becomes rougher the flexible seals can be separated from each other, causing further deterioration in ride quality. Also, in rough water the flexible seals frequently fail to maintain the air cushion, causing the craft's hull to drop lower into the water until the seal is regained and the air cushion is reestablished. The loss of the air cushion increases the hull contact with the water, resulting in an increase of the hull-to-water friction and a significantly slowing of the vessel. Seals are a high maintenance problem with frequent breakage that results in permanent loss of air cushion and a slow ride to the repair yard. Such SESs are disclosed by U.S. Pat. Nos. 5,415,120 and 4,392,445 to Donald E. Burg and U.S. Pat. No. 4,523,536 to Mark H. Smoot.

Notwithstanding the existence of such prior art for SESs, it remains clear that there is a need for a vessel which will maintain a relatively smooth ride and maintain the air cushion whether the water is smooth or rough without the use of flexible seals. Also, there is a need to improve the stability of SESs and hovercrafts, which are notoriously unstable in rough water.

This need was filled to an extent by U.S. Pat. No. 5,570,650, filed by the current inventor (see FIG. 1). On such vessels of well-designed pressurized air cushion vessels, the inboard walls of the fixed seals are effectively lubricated by the pressurized air. The sections of the hull that still retain or remain in contact with the water are where the vast majority of the drag is present. Specifically, the outboard walls of the fixed seals are still in contact with the water, and will generally create the primary remaining drag.

It should be noted that air is 750× less dense than water and has a correspondingly similar reduced drag; as such, if the sections of the hull that are in contact with the air can increase, there would be a corresponding decrease in drag. There have been attempts to lubricate the outboard sides of such fixed rigid seals. An example is holes in the rigid seals with air being pumped through these holes. This mechanism has been seen to be relatively ineffective.

Accordingly, what is needed is an improved watercraft hull with keels/fins that further reduce drag through the water. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved watercraft hull with reduced drag resistance is now met by a new, useful, and nonobvious invention.

In an embodiment, the current invention is a watercraft hull (e.g., of a surface effect vessel), including at least a pair of corresponding keels. Each keel is inwardly angled toward the longitudinal axis of the hull at the forward end of the keel, and outwardly angled away from the longitudinal axis of the hull at the rear end of the keel. In this way, the keels are oblique to each other, such that a fore spaced distance exists between the keels at the forward ends of the keels and a rear spaced distance exists between the keels at the rear ends of the keels. The rear spaced distance is greater than the fore spaced distance. Optionally, the keels may mirror each other across the longitudinal axis of the hull. This angled configuration of the keels creates an air cushion along the outboard wall of each keel, thus reducing drag resistance experienced by the hull traveling through water, for example by about 20% to about 45% or more specifically about 24% to about 42%.

One or both keels may be slanted relative to the longitudinal axis of the hull at an angle of about 0.02° to about 1°, or more specifically about 0.05° to about 0.50°, or most specifically about 0.25°. Additionally or alternatively, the keels may have a length-to-beam ratio of about 7% to about 14%, where this ratio is smaller at the forward ends of the keels than at the rear ends of the keels. More specifically, this ratio may be about 9% to about 10%.

The keels may be utilized on a plurality of catamaran hulls, such that each catamaran hull utilizes a pair of keels as described.

In a separate embodiment, the current invention is a watercraft hull with reduced drag resistance through water. The hull includes a plurality of keels each slanted at a predetermined angle relative to a longitudinal axis of the watercraft hull, such that the keels are closer together at a forward end of the keels and further away from each other at a rear end of the keels, creating air cushions along outboard walls of the keels. This hull may include one or more—or even all—of the previously-described characteristics and features, in particular with regards to the structure of the keels.

In a separate embodiment, the current invention is a surface effect vessel including a hull and keels, including one or more—or even all—of the previously described characteristics, features, and benefits thereof.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2C is a side view of a hull, according to an embodiment of the current invention.

DETAILED DESCRIPTION OF THE PREFERRED EMBODIMENT

Figure 1:
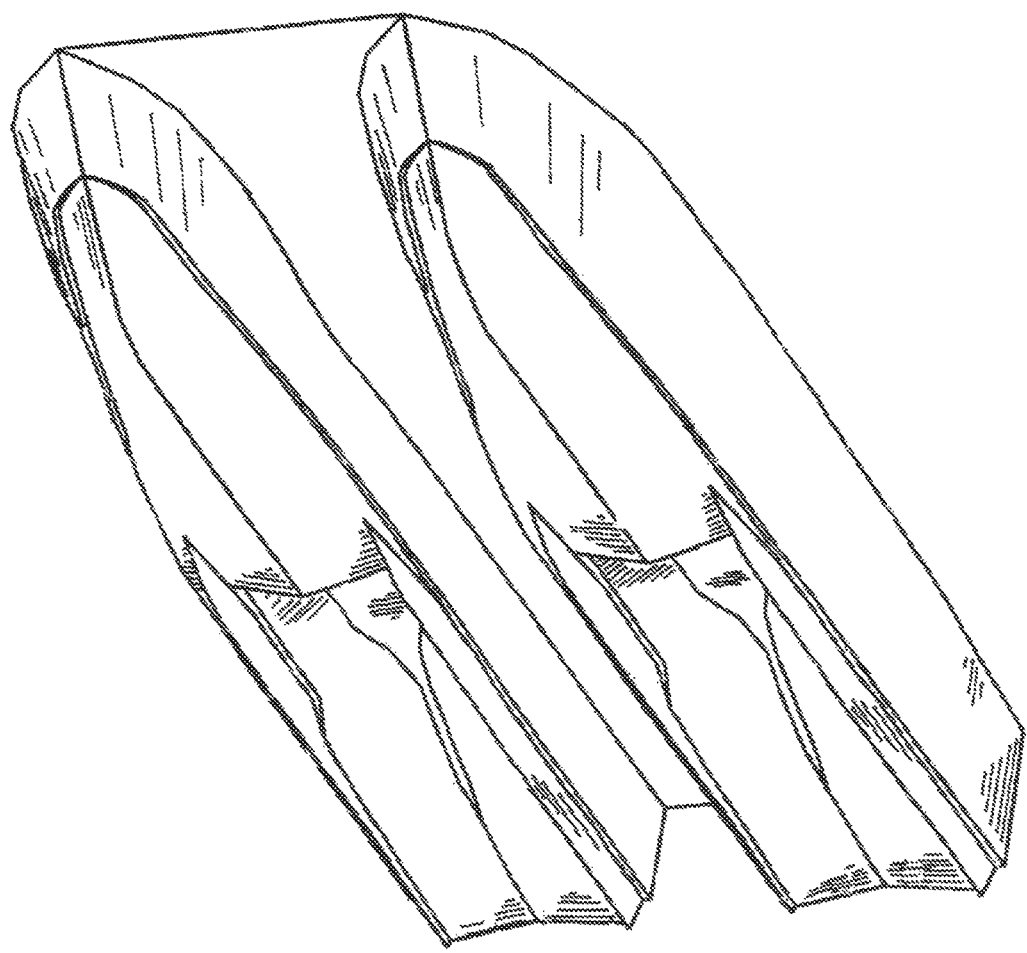
FIG. 1 is a lower perspective view of the hull illustrated in U.S. Pat. No. 5,570,650.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

It should be noted that ratios and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a ratio range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%-4%, 1.1%-3%, 2.2%-2.7%, 3.3%-4.5%, and 4.4%-5%) within the indicated range.

In certain embodiments, the current invention is a pressurized air cushioned hull with fixed rigid seals, often called rigid seals, where the hull includes a plurality of keels, with an air cushion disposed between inboard walls of each keel and an air cushion created/disposed along the outboard wall of each keel. These air cushions along the outboard walls of the keels are created by angling each keel by about 0.02° to about 1°, wherein the left keel of each hull is rotated clockwise and the right keel of each hull is rotated counterclockwise, such that the distance between the corresponding pair of keels is closer together at the front of the keels than the distance between the keels at the rear of the keels. Critically, this angled configuration results in air cushions to be present along the outboard walls of each keel. Allowing a significant volume of air, rather than just water, to contact the outboard walls reduces drag significantly, thus significantly improving performance of the hull as a whole.

In an embodiment, the current invention is a method and associated structural mechanism for positioning air on the outboard walls of the rigid seals of each keel, in other words contacting the outboard walls with air rather than water as is done in conventional hulls. The instant mechanism significantly reduces the remaining drag (i.e., the drag from the outboard walls contacting water when the inboard walls of the watercraft are contacting air, as described previously), resulting in the watercraft becoming as drag-free or frictionless as possible, by attacking and reducing the primary remaining drag area. In certain embodiments, the hull discussed herein and associated mechanism can be utilized with SESs.

As will be discussed herein, during multiple studies, the current watercraft hull with angled keels experienced a surprising and unexpected benefit to drag reduction as a result of a relatively small change in angle of each keel. Specifically, by angling each of the keels slightly inboard, between about 0.02° (2/100 of one degree) up to about 1°—a small but apparently distinctive turn that created an unrealized phenomenon. Without this angle, pressurized air normally would escape directly out the side, front, and rear of the pressurized air cushion(s) into the ambient atmosphere. With this slight angling, however, the pressurized air was seen to follow a new path of travel with the keels turned very slightly inboard. The escaping air at the front of each keel must follow a path of travel along the keel from front to rear, thus lubricating the outboard walls of the keels with new air cushions. This new path of travel for the escaping pressurized air creates an effective air lubrication that greatly reduces water contact on the outboard walls, specifically along the section of the outboard walls that is responsible for the primary remaining drag previously discussed.

With the current structure and mechanism, drag is greatly and significantly reduced to make the pressurized air cushion and rigid fixed side seal of the watercraft (e.g., SES) as drag-free as possible. In different tests, a hull design with straight parallel keels and another hull design with the slightly inboard-turned side seals were tested and compared to each other. The remainder of the hull designs were identical to each other, so it could be confirmed with certainty that any changes in drag reduction between the two designs were due exclusively to the slight change in angle of the keels. Notably, the approximate 0.02°-1° angle of each keel of the current invention unexpectedly resulted in a drag reduction by about 24% to about 42%. Even more specifically, the angle of each keel relative to a longitudinal axis of the hull is contemplated to be between about 0.05° and about 0.50° per keel/side. This small but apparently distinct change in keel angle was shown to be critical in providing an enormous reduction of drag, along with greatly increasing and providing improvements in performance, fuel flow, and power efficiencies. These unexpected improvements to hull design leads to a plethora of advantages, including, but not limited to, reduced power requirements, smaller engines, increased speeds, improved range, and reduced horsepower requirements and far less fuel burned.

In the general field of watercrafts, a hull that can reduce drag by even 5% or 10% is extremely significant, as this can result in millions of dollars of fuel saved per year on a single ocean-going ship. That being said, a hull design that reduces drag in the range of around 30%, as demonstrated by certain embodiments of the current invention herein, is an extraordinary and surprising gain, especially when considering the relatively minor change to the structure of the hull.

Whereas conventional designs are intended to improve performance inside the air cushioned section or between the keels (inside the tunnel), the instant invention has an opposite intent, specifically to improve performance on the outside of the keels by creating air cushions along the outboard walls of the keels.

Example

Figure 2A:
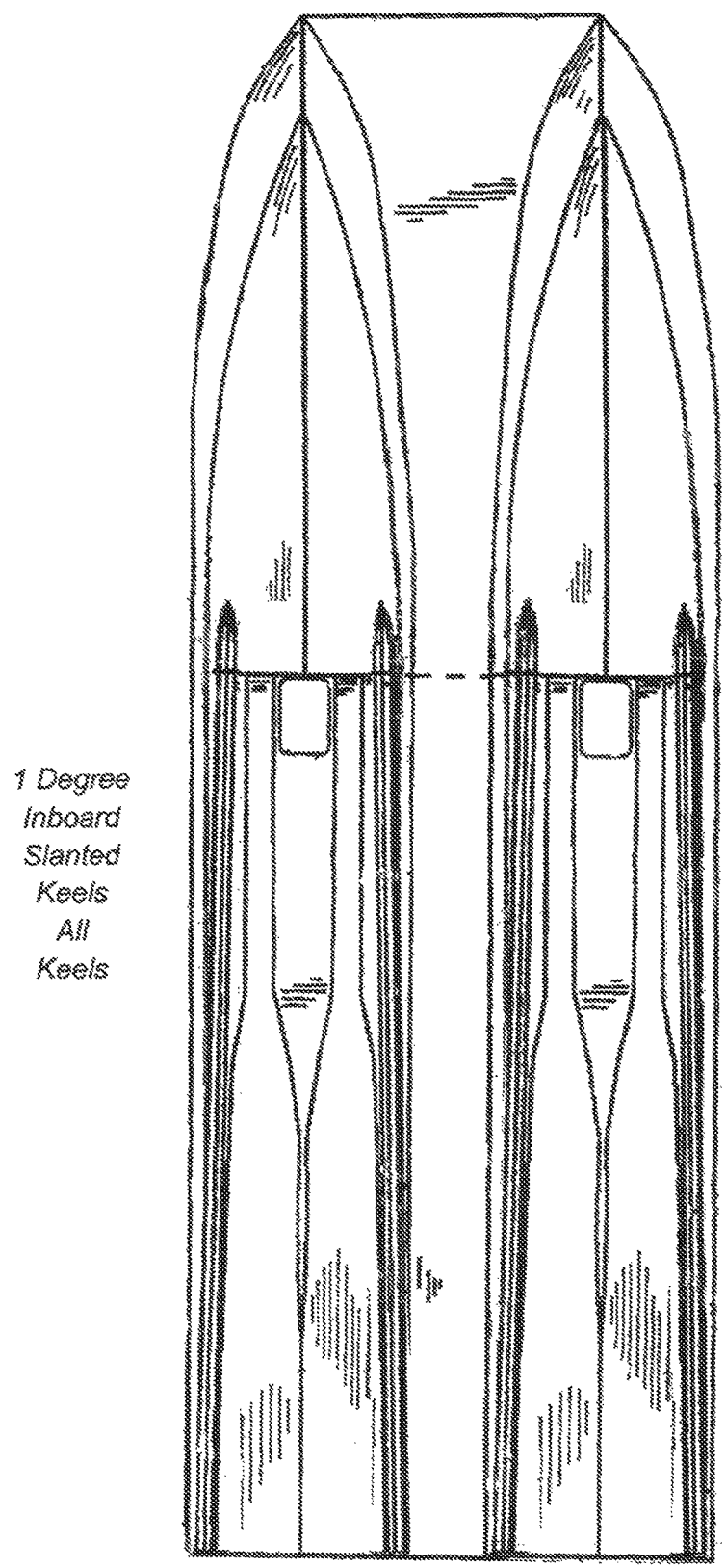
FIG. 2A is an elevated view of a bottom side of a hull, according to an embodiment of the current invention.
Figure 2B:
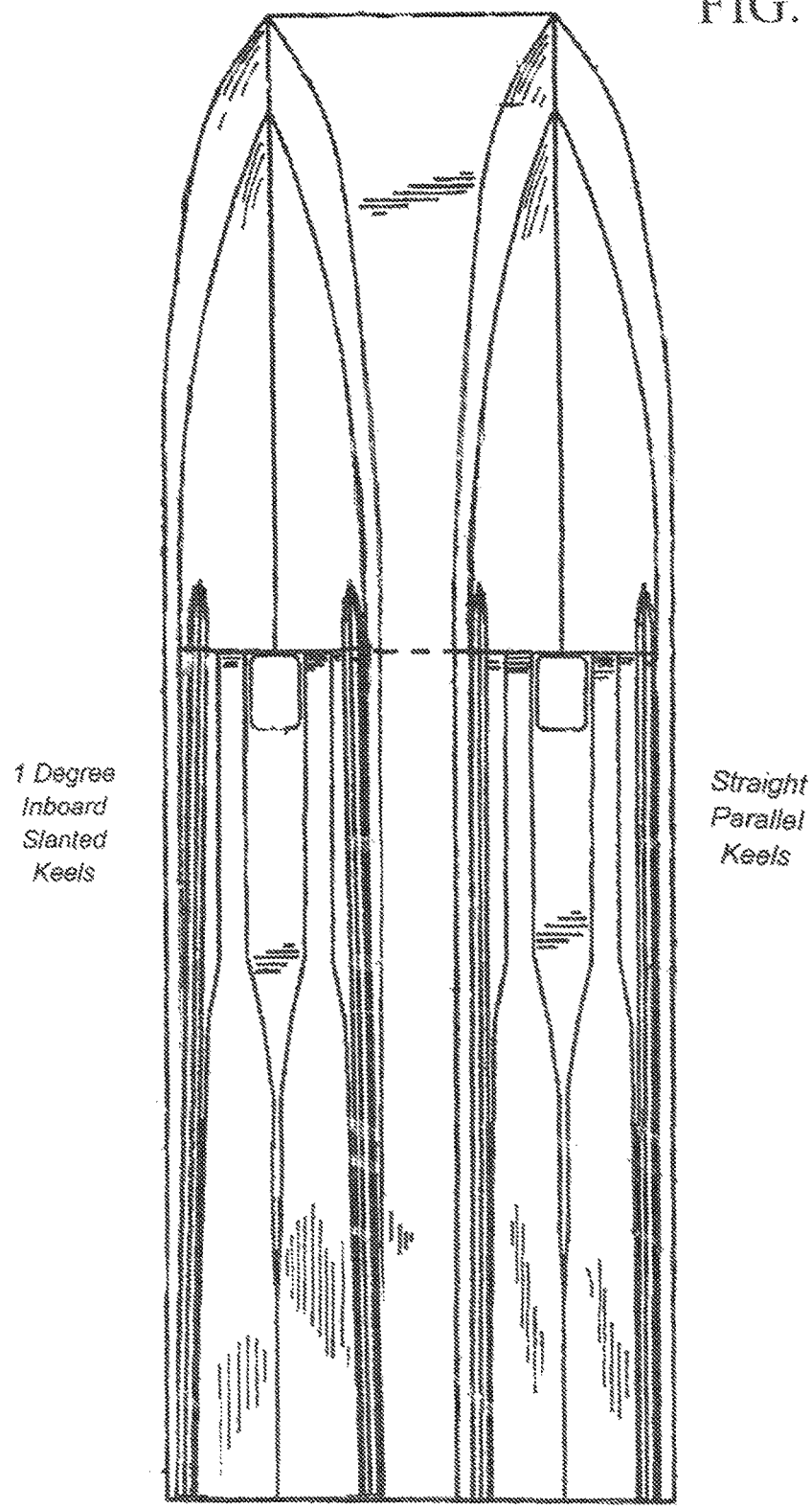
FIG. 2B is schematic of a bottom side of a hull depicting conventional keels compared to slanted keels.

FIGS. 2A, 2C, 4A, 4D, 4E, 5, and 6B depict an exemplary embodiment of the current invention. FIG. 2A is an elevated view of the bottom of the hull design showing inboard slanted keels for each keel at an angle of about 1°. Specifically, the design includes twin hulls with a pair of keels on each hull. The left keels of each pair are rotated clockwise about 1°, and the right keels of each pair are rotated counterclockwise about 1°. Due to there being such a small angle of the keels, FIG. 2B is a side-by-side view illustrating angled keels on the left side and parallel keels on the right side. FIG. 2C is a side view of the hull, showing the air cushion and fan blowing air into the air cushion.

Figure 3A:
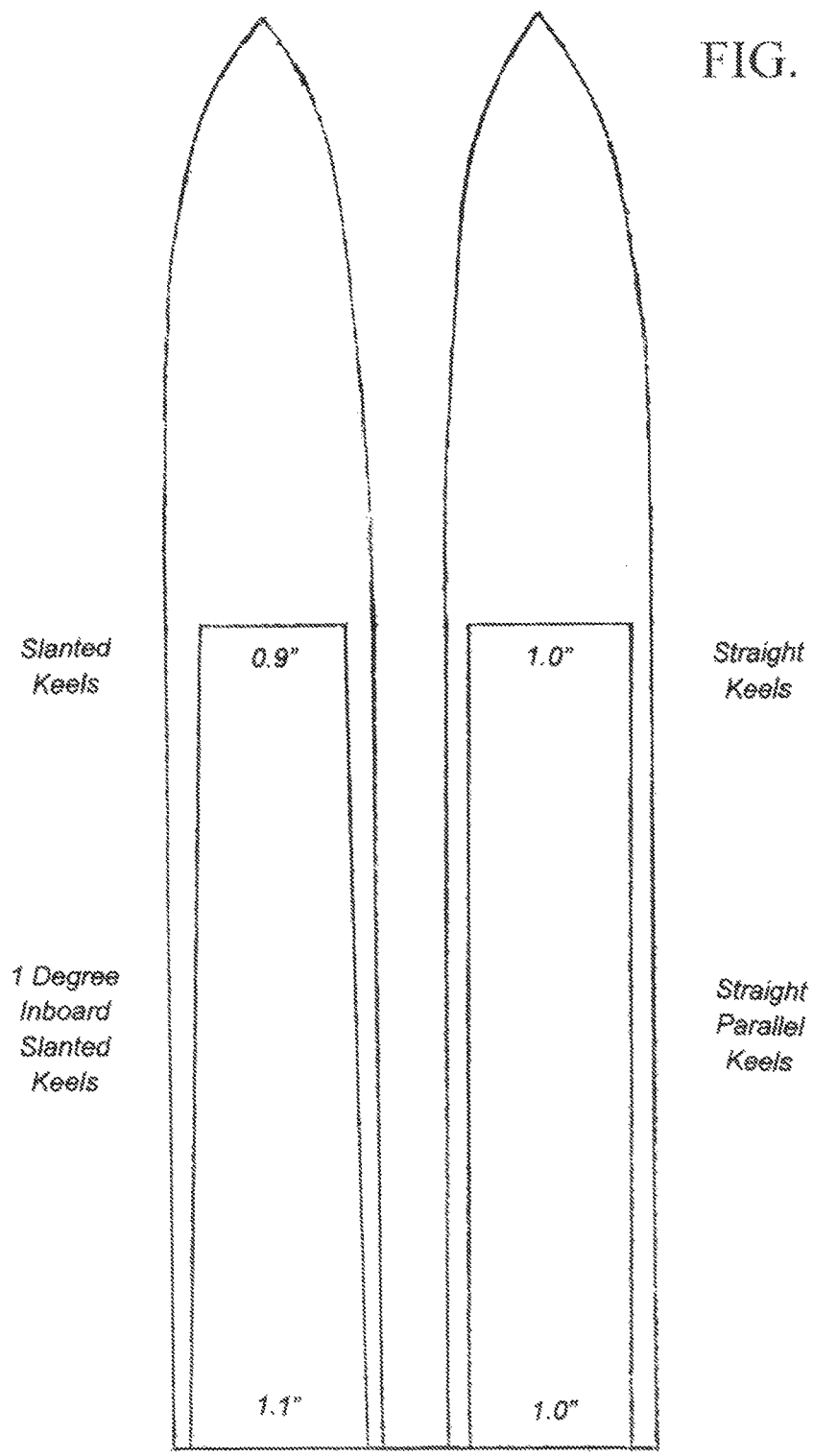
FIG. 3A is a schematic comparing conventional keels and slanted keels, illustrating difference in distances between keels.
Figure 3B:
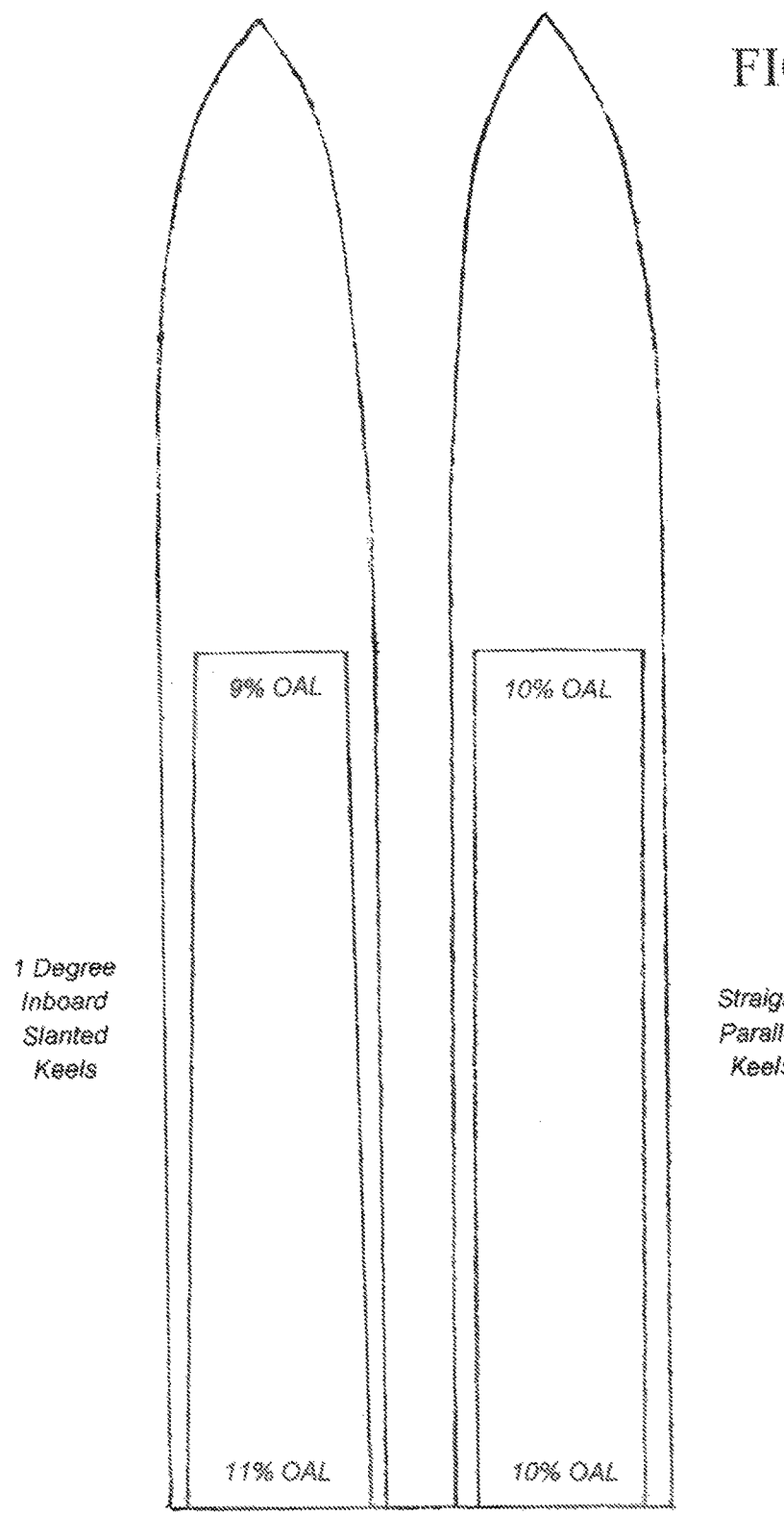
FIG. 3B is a schematic comparing conventional keels and slanted keels, illustrating difference in length-to-beam ratios.

The schematics of FIGS. 3A-3B illustrate this structure even more clearly with the line drawings simplified substantially to show just the keels without the contours. FIG. 3A again compares angled keels (left side) to parallel keels (right side). Specifically, with the angled keels, the keels are slanted in such a way that there is a 0.9" distance between the keels at the front of the keels and a 1.1" distance between the keels at the rear of the keels. Thus, it can be seen that the distance between the keels increases along their lengths from front-to-rear. Contrastingly, the parallel keels maintain a 1.0" distance between the keels along their lengths. It should be noted that these distances are relative to a nine (9)-inch hull. As the length of the hull increases, the distance between the keels can increase a corresponding amount. Alternative distances between the keels are also contemplated herein, as long as distance increases from the front of the keels to the rear of the keels; having a ~0.9"-1.1" distance between the keels for a 9" hull is just one non-limiting example.

To depict this structure through a different metric, FIG. 3B also compares length-to-beam ratio (overall length of hull to width of each air cushion or distance between keels) between angled keels (left side) to length-to-beam ratio between parallel keels (right side). Specifically, with the angled keels, the distance between the keels is about 9% of the overall length of the hull at the front of the keels (9% OAL) and is about 11% of the overall length of the hull at the rear of the keels (11% OAL). This difference in OAL is found with a maximum 1° angle of each keel; with a front OAL of about 9%, an optimal rear OAL is about 10%, typically found with about a 0.25° angle. Thus, it can again be seen that the distance between the keels increases along their lengths from front-to-rear. Contrastingly, the parallel keels maintain 10% OAL between the keels along their lengths. Alternative ratios between the keels are also contemplated herein, as long as ratio increases from the front of the keels to the rear of the keels; having a ~9%-11% OAL and a ~9%-10% OAL between the keels are just two non-limiting examples. It is further contemplated herein that the length-to-beam ratio of the current keels can be about 7% to about 14%, which was found to be an optimal range for reducing drag.

Relatedly, it is contemplated herein that in certain embodiments of the current invention, the length of each air cushion is about 40% to about 85% of the total length of the hull.

Figure 4A:
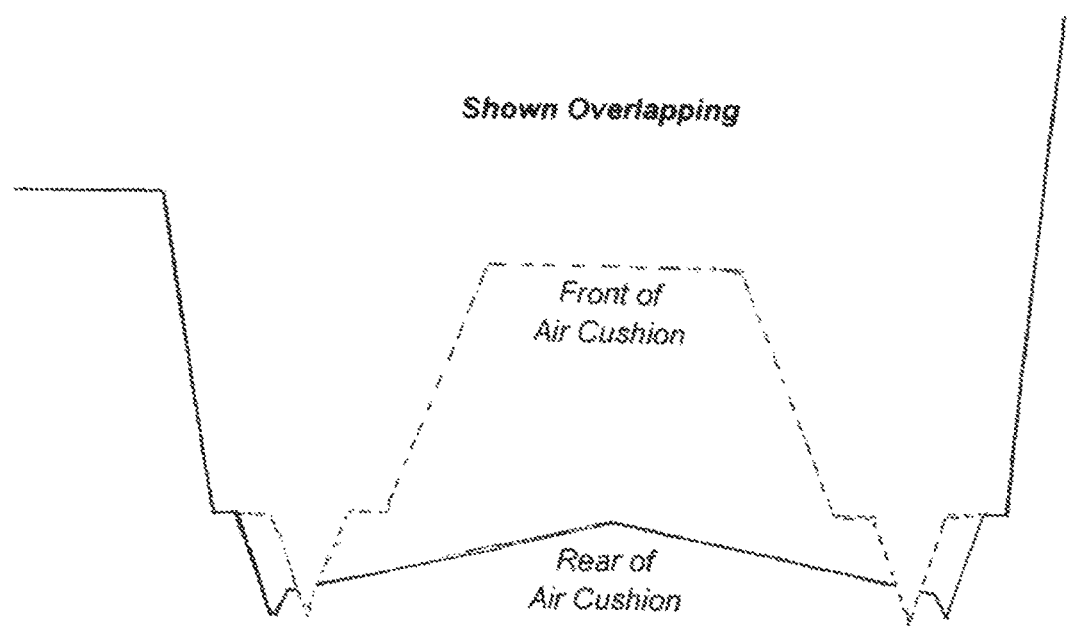
FIG. 4A is a schematic illustrating a front end of two keels and a rear end of the same two keels, where they overlap each other, showing a difference in distance between the keels from their front end to their rear end.
Figure 4B:
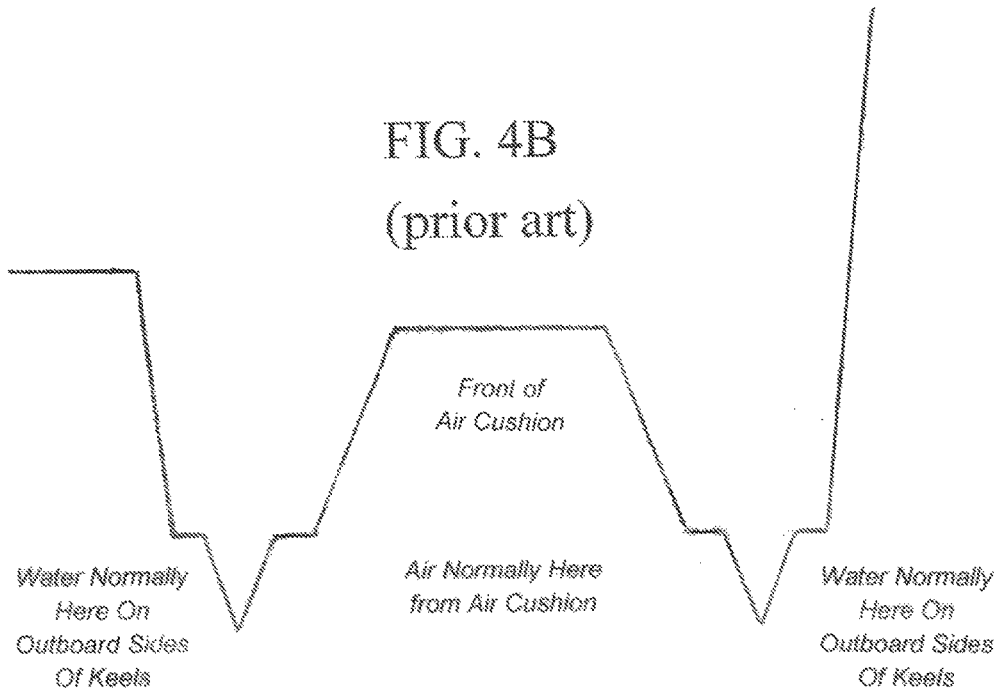
FIG. 4B is a schematic of a front end of conventional keels, where the schematic indicates water contacting the outboard walls of the keels. In other words, no air cushions exist along the outboard walls of the keels.
Figure 4C:
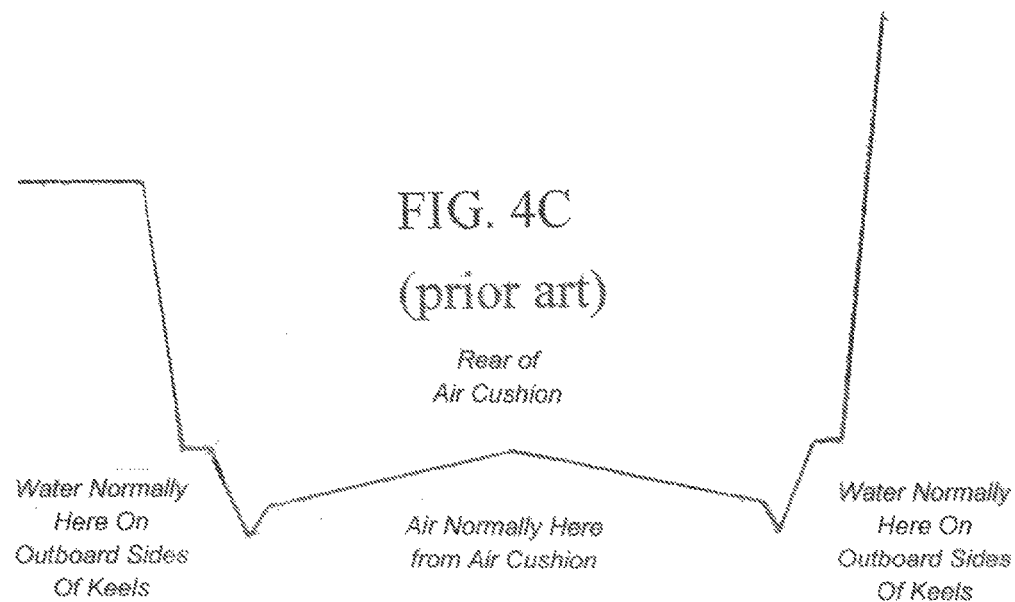
FIG. 4C is a schematic of a rear end of conventional keels, where the schematic indicates water contacting the outboard walls of the keels. In other words, no air cushions exist along the outboard walls of the keels. When compared against each other, FIGS. 4B-4C further depict no difference in distance between the keels from their front end to their rear end.
Figure 4D:
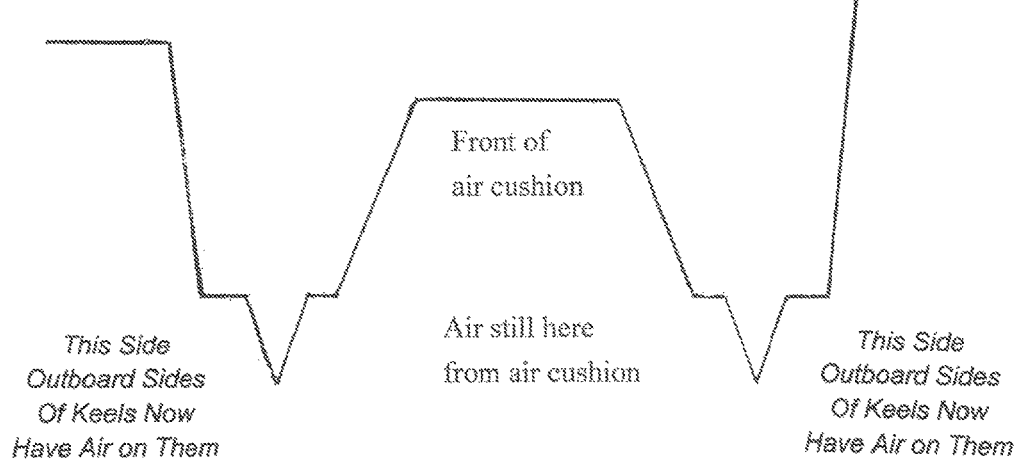
FIG. 4D is a schematic of a front end of keels, according to an embodiment of the current invention, where the schematic indicates air contacting the outboard walls of the keels. In other words, an air cushion is formed along the outboard wall of each keel.
Figure 4E:
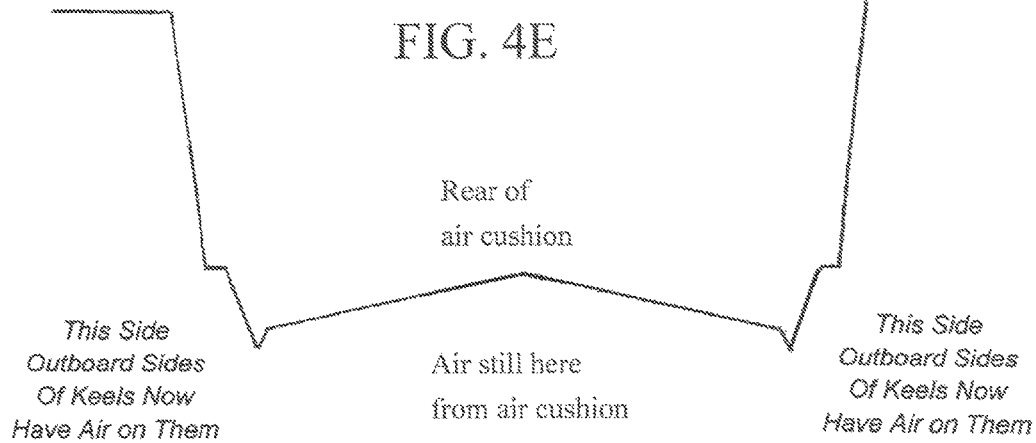
FIG. 4E is a schematic of a rear end of keels, according to an embodiment of the current invention, where the schematic indicates air contacting the outboard walls of the keels. In other words, an air cushion is formed along the outboard wall of each keel.

FIG. 4A shows the front and rear of a keel, according to an embodiment of the current invention, where the ends of the keel are depicted overlapping each other for illustrative and comparison purposes. The schematic clearly depicts the narrower distance between the keels at the front of the keels and the longer distance between the keels at the rear of the keels. FIGS. 4B-4E are general schematics of the front and rear of two keels, where FIGS. 4B-4C depict conventional keels and FIGS. 4D-4E depict keels according to embodiments of the current invention. The structural differences between FIGS. 4B-4C and FIGS. 4D-4E may not be readily apparent due to the small angular rotation of the current keels, but what is more relevant to these figures is the textual labels. Using a conventional hull (FIGS. 4B-4C), an air cushion is positioned between the inboard walls of the keels, and water is disposed along the outboard walls of the keels. Contrastingly, using the current hull (FIGS. 4D-4E), not only is the air cushion still positioned between the inboard walls of the keels, but air cushions or air lubrication is created along the outboard walls of each keel.

Figure 5:
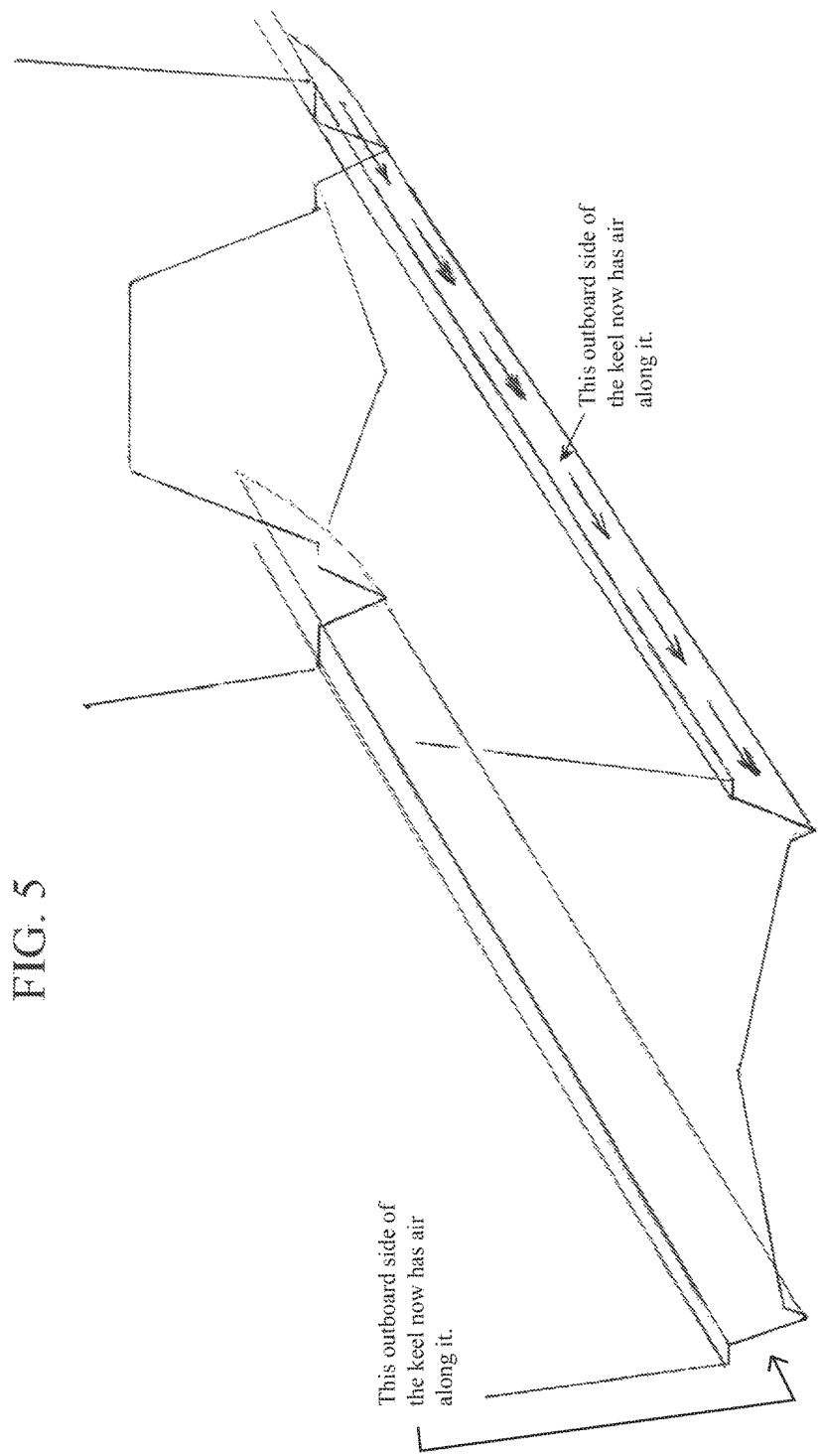
FIG. 5 is a perspective schematic view of keels, according to an embodiment of the current invention, showing the flow of air along the outboard walls of the keels.
Figure 6A:
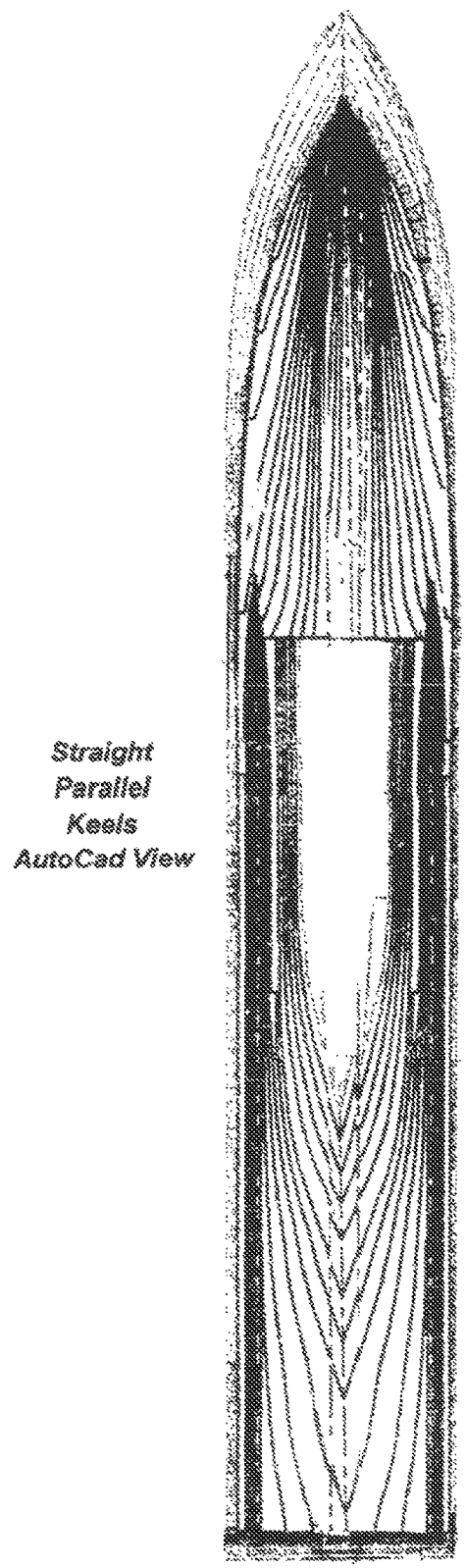
FIG. 6A depicts straight/parallel keels in a conventional hull in an AUTOCAD view.
Figure 6B:
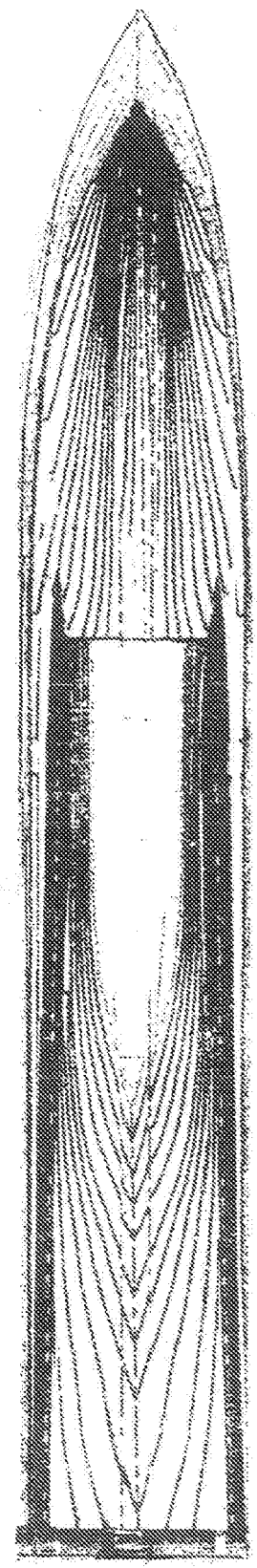
FIG. 6B depicts inward slanted keels in a hull, according to an embodiment of the current invention, in an AUTOCAD view.

FIG. 5 depicts the direction of airflow along the outboard walls of the keels. FIGS. 6A-6B are illustrations comparing shapes of conventional hulls (FIG. 6A) versus the current hull (FIG. 6B). In FIG. 6B, new air cushions/flow can be seen on the outside of the outboard walls of the keels.

The foregoing descriptions and the corresponding figures teach angled keels underlying a twin hull design of a watercraft/vessel. However, it is contemplated herein that the current keels can also be used in a single hull design. Rather than four (4) keels extending from twin hulls, there would be two (2) keels extending from a single hull. A single hull design may further include outriggers or other components as would be understood by one of ordinary skill in the art.

It is further contemplated herein that the current angled keels can be utilized in a tri-hull design, a quad-hull design, or any other number of hulls desired. Ultimately, a set of two (2) angled keels is used for each hull, regardless of how many hulls are present.

Study

To demonstrate the efficacy and unexpected results obtained by angled keels discussed herein, both a watercraft model with parallel keels (conventional) and a watercraft model with angled keels (current) were driven on water and observed for changes or differences in drag resistance experienced by the watercrafts. As will be seen, the watercraft model with parallel keels and the watercraft model with angled keels were substantially identical in every way (including weight, center of gravity (CG), and speed during each test), other than the angle of the keels. Specifically, the angle of the keels with the straight keels and about 0.25° with the angled keels. In the latter model, the left keel is rotated clockwise about 0.25°, and the right keel is rotated counterclockwise about 0.25°, resulting in the keels being about 6% closer together at the forward ends of the keel than the distance between the straight keels. As discussed previously, benefits are seen in the range of about 0.02° and about 1°; an exemplary, non-limiting angle of 0.25° was utilized herein for the current study. An angle less than about 0.02° results in minimal-to-no effect on drag, as compared to parallel keels, and an angle greater than about 1° results in increased drag due to the keels being positioned further laterally.

To compare the models/keels directly, the models were driven on the same body of water over the course of six (6) different days. Data was recorded, with data from one (1) day being discarded due to the water being excessively rough/choppy. Data over the remaining (5) days was recorded and analyzed to compare effect of the keels on the watercrafts. The models were also run at different weights and at different speeds to ensure that any difference in drag resistance was due solely to the change in keel configuration (i.e., angle). As noted, the weight and the CG of each respective compared model pair were the same. For example, if weight of one model was increased during a particular test, then the weight of the other model was also increased. Each model was weighed at initiation of each set of runs. Additionally, the very same fans were utilized in the models to maintain consistency and objectivity of the comparison.

To measure and evaluate drag resistance experienced by the models during each run, the model being tested is towed alongside a watercraft using a boom extending laterally from the watercraft. Blowers are disposed to feed air beneath the models as well. Utilizing a cable and pulley system in conjunction with a digital scale (digital control box: BTEK T103P; load cell: CELTRON STC HSS Stainless Steel S-Beam 500), the scale instantaneously reads and outputs a value of pounds of drag resistance (to the 1/10 of a pound) experienced by the model being tested. This value is recorded every 1-2 seconds. All values of drag resistance are added for a given run and divided by the number of data points taken, thus obtaining an average drag for that run. A marine GPS (e.g., MAGELLAN GPS 3000 XL) was utilized to measure speed, such that a consistent and accurate speed could be maintained.

Through the acceptable five (5) days of testing and using the foregoing methodology, over 700 points of data were recorded and analyzed to compare the models against each other. Table 1 summarizes data from the models used, along with resulting drag data, for each day. Model A included angled keels, and model B included straight keels).

TABLE 1

| Model | Weight | CG" | Speed | Average Lbs. Drag | # of Samples |
|---|---|---|---|---|---|
| Day 1 | | | | | |
| A (angled) | 70 | 32 | 20 | 7.20 | 11 |
| B (straight) | 70 | 32 | 20 | 9.20 | 13 |
| Day 2 | | | | | |
| A (angled) | 70 | 32 | 20 | 7.20 | 18 |
| B (straight) | 70 | 32 | 20 | 9.40 | 19 |

TABLE 1-continued

| Model | Weight | CG" | Speed | Average Lbs. Drag | # of Samples |
|---|---|---|---|---|---|
| Day 3 | | | | | |
| A (angled) | 70 | 32 | 20 | 7.10 | 22 |
| B (straight) | 70 | 32 | 20 | 9.3 | 24 |
| Day 4 | | | | | |
| A (angled) | 77 | 32 | 16 | 7.68 | 10 |
| A (angled) | 77 | 32 | 18 | 7.74 | 10 |
| A (angled) | 77 | 32 | 20 | 7.97 | 17 |
| A (angled) | 77 | 32 | 20 | 8.27 | 16 |
| A (angled, summary) | 77 | 32 | 20 | Summary: 8.12 | 33 |
| B (straight) | 77 | 32 | 16 | 9.53 | 24 |
| B (straight) | 77 | 32 | 18 | 10.51 | 24 |
| B (straight) | 77 | 32 | 20 | 10.62 | 83 |
| B (straight) | 77 | 32 | 20 | 12.30 | 19 |
| B (straight, summary) | 77 | 32 | 20 | Summary: 10.77 | 115 |
| Day 5 | | | | | |
| A (angled) | 99 | 32 | 16 | 10.74 | 17 |
| A (angled) | 99 | 32 | 20 | 10.56 | 44 |
| A (angled) | 99 | 32 | 20 | 10.40 | 16 |
| A (angled) | 99 | 32 | 20 | Summary: 10.51 | 60 |
| A (angled) | 99 | 32 | 22 | 10.90 | 26 |
| B (straight) | 99 | 32 | 16 | 14.74 | 22 |
| B (straight) | 99 | 32 | 16 | 13.27 | 34 |
| B (straight) | 99 | 32 | 16 | Summary: 13.85 | 56 |
| B (straight) | 99 | 32 | 20 | 13.20 | 44 |
| B (straight) | 99 | 32 | 20 | 16.62 | 54 |
| B (straight) | 99 | 32 | 20 | 13.56 | 10 |
| B (straight) | 99 | 32 | 20 | 15.22 | 9 |
| B (straight) | 99 | 32 | 20 | Summary: 14.96 | 117 |
| B (straight) | 99 | 32 | 22 | 15.22 | 63 |
| B (straight) | 99 | 32 | 22 | 16.90 | 8 |
| B (straight) | 99 | 32 | 22 | 16.35 | 24 |
| B (straight) | 99 | 32 | 22 | 14.74 | 26 |
| B (straight) | 99 | 32 | 22 | Summary: 15.45 | 121 |

Processing the above-referenced data, Table 2 compares against each other the watercraft model with straight keels and the watercraft model with angled keels.

TABLE 2

| Weight | Speed (mph) | Avg. Model A Drag (lbs.) | Avg. Model B Drag (lbs.) | Extra Drag of Model B Over & Above Model A |
|---|---|---|---|---|
| Day 1 | | | | |
| 70 | 20 | 7.2 | 9.2 | 27.7% |
| Day 2 | | | | |
| 70 | 20 | 7.2 | 9.4 | 30.5% |
| Day 3 | | | | |
| 70 | 20 | 7.1 | 9.3 | 31% |
| Day 4 | | | | |
| 77 | 16 | 7.68 | 9.53 | 24.1% |
| 77 | 18 | 7.74 | 10.51 | 35.8% |
| 77 | 20 | 8.12 | 10.77 | 32.6% |
| Day 5 | | | | |
| 99 | 16 | 10.74 | 13.85 | 29% |
| 99 | 20 | 10.51 | 14.96 | 42.3% |
| 99 | 22 | 10.90 | 15.45 | 41.7% |

In total, the additional or extra drag of Model B (straight keel) over Model A (slanted keel) was observed to range from a low of about 24.1% to a high of about 42.3%, with a net average about 33.4%. It is contemplated that the use of angled keels as discussed herein can result in a reduction of drag resistance between about 20% and about 45%, relative to use of straight parallel keels. Relatively speaking, the smallest improvements were seen at slower speeds and lighter loads/weight, whereas the greatest improvements were seen at faster speeds and heavier loads/weight. Overall, the significant and unexpected reductions in drag were indeed directly attributable to the slightly angled configuration of each keel on the watercraft.

Glossary of Claim Terms

Air cushion: This term is used herein to refer to a layer of air supporting a watercraft underwater and disposed along the walls of the keels.

Fore spaced distance: This term is used herein to refer to a gap or space between two components of a watercraft at the front end of the components or at the front end of the watercraft.

Inwardly angled: This term is used herein to refer to the inboard slanting of a component of a watercraft. For example, if a portion of a keel is inwardly angled, then it is slanted toward the central longitudinal axis of the watercraft.

Length-to-beam ratio: This term is used herein to refer to an overall length of the hull of the watercraft to width of each air cushion between keels (or distance between keels).

Outboard wall: This term is used herein to refer to an outer surface of each keel.

Outwardly angled: This term is used herein to refer to the outboard slanting of a component of a watercraft. For example, if a portion of a keel is outwardly angled, then it is slanted toward the outer perimeter of the watercraft.

Rear spaced distance: This term is used herein to refer to a gap or space between two components of a watercraft at the back end of the components or at the back end of the watercraft.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A hull of a watercraft, comprising:
a first keel positioned laterally on one side of a longitudinal axis of the hull, wherein the first keel is
inwardly angled toward the longitudinal axis of the hull at a forward end of the first keel, and
outwardly angled away from the longitudinal axis of the hull at a rear end of the first keel;
a second keel positioned laterally on an opposite side of the longitudinal axis of the hull, wherein the second keel is
inwardly angled toward the longitudinal axis of the hull at a forward end of the second keel, and
outwardly angled away from the longitudinal axis of the hull at a rear end of the second keel,
wherein the first and second keels are oblique to each other, such that a fore spaced distance exists between the first keel and the second keel at the forward ends of the first and second keels, a rear spaced distance exists between the first keel and the second keel at the rear ends of the first and second keels, and the rear spaced distance is greater than the fore spaced distance, whereby an angled configuration of the first and second keels creates a first air cushion along an outboard wall of the first keel and a second air cushion along an outboard wall of the second keel, thus reducing drag resistance experienced by the hull traveling through water.

2. The hull of claim 1, wherein the watercraft is a surface effect vessel.

3. The hull of claim 1, wherein the first keel and the second keel mirror each other about the longitudinal axis of the hull.

4. The hull of claim 1, wherein the first keel is slanted relative to the longitudinal axis of the hull at an angle of about 0.02° to about 1°.

5. The hull of claim 4, wherein said second keel is slanted relative to the longitudinal axis of the hull at an angle of about 0.02° to about 1°.

6. The hull of claim 4, wherein the angle of the first keel is between about 0.05° and about 0.50°.

7. The hull of claim 6, wherein the angle of the second keel is between about 0.05° and about 0.50°.

8. The hull of claim 3, wherein the first and second keels are each slanted relative to the longitudinal axis of the hull at an angle of about 0.02° to about 1°.

9. The hull of claim 8, wherein the angle of the each keel is between about 0.05° and about 0.50°.

10. The hull of claim 1, wherein
the first and second keels have a length-to-beam ratio of about 7% to about 14% relative to the longitudinal axis of the hull, and the length-to-beam ratio at the forward ends of the first and second keels is smaller than the length-to-beam ratio at the rear ends of the first and second keels.

11. The hull of claim 10, wherein the length-to-beam ratio at the forward ends of the first and second keels is about 9% and the length-to-beam ratio at the rear ends of the first and second keels is about 10%.

12. The hull of claim 1, wherein the hull is a first catamaran hull of a plurality of catamaran hulls, wherein the remainder of the plurality of catamaran hulls each includes slanted or angled keels that are substantially similar to the first and second keels.

13. The hull of claim 1, wherein the angled configuration of the first and second keels reduces drag resistance by between about 20% to about 45%.

14. A watercraft hull with reduced drag resistance through water, comprising a plurality of keels each slanted at a predetermined angle between about 0.02° to about 1° relative to a longitudinal axis of the watercraft hull, such that the keels are closer together at a forward end of the keels and further away from each other at a rear end of the keels, creating air cushions along outboard walls of the keels.

15. The watercraft hull of claim 14, wherein the predetermined angle of each keel is between about 0.05° and about 0.50° relative to longitudinal axis of the watercraft hull.

16. The watercraft hull of claim 14, wherein the plurality of keels includes at least a first keel and a second keel that mirror each other across the longitudinal axis of the hull.

17. The watercraft hull of claim 14, wherein
the first and second keels have a length-to-beam ratio of about 7% to about 14% relative to the longitudinal axis of the hull, and the length-to-beam ratio at the forward end of the plurality of keels is smaller than the length-to-beam ratio at the rear end of the plurality of keels.

18. The watercraft hull of claim 17, wherein the length-to-beam ratio at the forward end of the plurality of keels is about 9% and the length-to-beam ratio at the rear end of the plurality of keels is about 10%.

19. The watercraft hull of claim 14, wherein the creation of the air cushions along the outboard walls of the keels reduces drag resistance by between about 20% to about 45%.

20. A surface effect vessel hull having a central longitudinal axis, said surface effect vessel hull comprising:

a first catamaran hull and a second catamaran hull joined together by a deck, each catamaran hull defining a longitudinal dimension;

wherein said first catamaran hull is positioned on a left side of said central longitudinal axis and said second catamaran hull is positioned on a right side of said central longitudinal axis, wherein said first catamaran hull defines a first set of keels that are inwardly slanted at a front end of said first set of keels and outwardly slanted at a rear end of said first set of keels, the inward and outward slants being relative to said longitudinal dimension of said first catamaran hull, such that said first set of keels are oblique to each other with said first set of keels having a fore distance between each other at said front end and a rear distance between each other at said rear end, said fore distance between said first set of keels being smaller than a rear distance between said first set of keels, wherein said first set of keels are slanted relative to said longitudinal dimension of said first catamaran hull at an angle of about 0.05° to about 0.50°, wherein said second catamaran hull defines a second set of keels that are inwardly slanted at a front end of said second set of keels and outwardly slanted at a rear end of said second set of keels, the inward and outward slants being relative to said longitudinal dimension of said second catamaran hull, such that said second set of keels are oblique to each other with said second set of keels having a fore distance between each other at said front end and a rear distance between each other at said rear end, said fore distance between said second set of keels being smaller than a rear distance between said second set of keels, wherein said second set of keels are slanted relative to said longitudinal dimension of said second catamaran hull at an angle of about 0.05° to about 0.5°, wherein said first set of keels and said second set of keels are symmetric to each other about said central longitudinal axis of said surface effect vessel hull, said first set of keels and said second set of keels each having inboard walls and outboard walls;

a left inboard air cushion created between said inboard walls of said first set of keels;

a right inboard air cushion created between said inboard walls of said second set of keels;

one or more left outboard air cushions created along said outboard walls of said first set of keels;

one or more right outboard air cushions created along said outboard walls of said second set of keels;

a length-to-beam ratio of about 7% to about 12% for said left inboard air cushion and said right inboard air cushion relative to the longitudinal axis of the hull, wherein said length-to-beam ratio of said left inboard air cushion is about 9% at said front end of said first set of keels and about 10% at said rear end of said first set of keels, wherein said length-to-beam ratio of said right inboard air cushion is about 9% at said front end of said second set of keels and about 10% at said rear end of said second set of keels, whereby said left inboard air cushion, said right inboard air cushion, said one or more left outboard air cushions, and said one or more right outboard air cushions collectively reduce drag resistance experienced by said surface effect vessel hull through water, whereby said drag resistance of said surface effect vessel hull through water is reduced by about 24% to about 42% relative to said left inboard air cushion and said right inboard air cushion alone without said one or more left outboard air cushions and said one or more right outboard air cushions.

21. A surface effect ship that utilizes the surface effect vessel hull of claim 20, wherein said surface effect ship has a single hull design, a twin hull design, a tri-hull design, or a quad-hull design.

\* \* \* \* \*